(12) United States Patent
Heady et al.

(10) Patent No.: US 6,215,655 B1
(45) Date of Patent: Apr. 10, 2001

(54) DRIVE-IN ORDERING APPARATUS

(75) Inventors: Gregory S. Heady; Anne C. Heady, both of Phoenix, AZ (US)

(73) Assignee: Lacerta Enterprises, Inc., Phoenix, AZ (US)

( * ) Notice: Subject to any disclaimer, the term of this patent is extended or adjusted under 35 U.S.C. 154(b) by 0 days.

(21) Appl. No.: 08/962,346

(22) Filed: Oct. 31, 1997

(51) Int. Cl.$^7$ ............................................ G06F 1/16
(52) U.S. Cl. .................... 361/683; 181/198; 181/151; 381/353; 381/354
(58) Field of Search ...................... 52/36.1, 79.1; 361/683, 685, 687, 690, 695; 312/100, 8.16, 210, 213, 101, 102, 223.1; 181/199, 198, 151; 381/353, 354, 392

(56) References Cited

U.S. PATENT DOCUMENTS

| | | | |
|---|---|---|---|
| 3,210,456 | * 10/1965 | Skubal | 312/213 |
| 3,364,838 | * 1/1968 | Bradley | 312/213 |
| 3,621,339 | * 11/1971 | Hodgson | 317/103 |
| 3,912,348 | * 10/1975 | Seymour | 312/100 |
| 4,002,831 | 1/1977 | Aeschliman . | |
| 4,134,624 | 1/1979 | Moyer . | |
| 4,179,723 | * 12/1979 | Spencer | 361/384 |
| 4,447,856 | 5/1984 | Takahashi et al. . | |
| 4,528,614 | 7/1985 | Shariff et al. . | |
| 4,561,704 | * 12/1985 | Smith | 312/210 |
| 4,644,408 | 2/1987 | Coleman . | |
| 4,827,439 | 5/1989 | Licht . | |
| 4,836,625 | 6/1989 | Catta . | |
| 4,935,845 | 6/1990 | Schwehr et al. . | |
| 4,949,934 | 8/1990 | Krenz et al. . | |
| 4,985,803 | 1/1991 | Pum et al. . | |
| 5,053,868 | * 10/1991 | Higgins et al. | 358/93 |
| 5,091,827 | 2/1992 | Suret et al. . | |
| 5,243,493 | 9/1993 | Jeng et al. . | |
| 5,271,669 | 12/1993 | Pearlson . | |
| 5,475,562 | * 12/1995 | Gow | 361/695 |
| 5,493,457 | * 2/1996 | Kawamura et al. | 369/75.1 |
| 5,493,474 | * 2/1996 | Schkrohowsky et al. | 361/695 |
| 5,529,120 | 6/1996 | Howard et al. . | |
| 5,536,079 | 7/1996 | Kostic . | |
| 5,559,671 | 9/1996 | Dan et al. . | |
| 5,573,317 | 11/1996 | Cavanaugh et al. . | |
| 5,590,407 | 12/1996 | Ishikawa et al. . | |
| 5,717,568 | * 2/1998 | Clutter et al. | 361/683 |
| 5,781,410 | * 7/1998 | Keown | 361/690 |
| 5,860,715 | * 1/1999 | Lohde et al. | 312/100 |
| 5,870,485 | * 2/1999 | Lundgren et al. | 381/306 |
| 5,894,407 | * 4/1999 | Aakalu | 361/695 |

* cited by examiner

Primary Examiner—Carl D. Friedman
Assistant Examiner—Dennis L. Dorsey
(74) Attorney, Agent, or Firm—Schmeiser, Olsen & Watts

(57) ABSTRACT

An apparatus for protecting equipment in an outdoor communication structure from adverse weather conditions, vibration, and vandalism includes a housing that possesses hidden lip door edges and is assembled such that no screws, nuts, hinges, etc. are left exposed. Also, any speakers and/or microphones are largely isolated from potential vibration by surrounding them with vibration dampeners such as foam or other padding or insulation. Heat, dust intake, vibration, and electricity usage are reduced by providing convection venting wherein the internal cavity of the housing narrows at a top region of the housing. Vents in the top region of the housing allow air from the narrowed internal cavity to escape as it heats and expands. As hot air is displaced from the narrowed internal cavity, cooler ambient air is drawn into the internal cavity through bottom vents in a bottom region of the housing. Dust accumulation on an electronic display screen is prevented by affixing the display to a mechanism with adjustable support members for tilting a shelf and pressing the display screen firmly against the front panel of the housing to seal it off.

30 Claims, 9 Drawing Sheets

DRIVE-IN ORDERING APPARATUS

RELATED APPLICATION

This application is related to other patent applications by Heady, et al. entitled "METHOD AND APPARATUS FOR DISSIPATING HEAT FROM AN ELECTRONIC DISPLAY", Ser. No. 08/960,525, filed Oct. 31, 1997, and "METHOD AND APPARATUS FOR A TRANSPARENT NETWORK GUEST CONTROLLER", Ser. No. 08/992,372, filed Dec. 17, 1997, and each is incorporated herein by reference.

BACKGROUND OF THE INVENTION

1. Technical Field

This invention relates to the field of equipment housings for outdoor communication structures. More specifically the invention relates to an apparatus for protecting equipment in a walk-up or drive-in ordering apparatus.

2. Background Art

One of the services that modern businesses offer with increasing frequency is the ability to transact business while remaining in an automobile or at a walk-up structure. Consumers find such services appealing because of the convenience and efficiency with which they can complete tasks such as purchasing goods, arranging for services, conducting bank transactions, and paying bills. Drive-in or walk-up ordering is commonly associated with fast-food restaurants and dry-cleaning businesses. However, these transactions may also occur at banks or other establishments where feasible.

The outdoor communication structures currently used by walk-up or drive-in businesses also have certain disadvantages. Because such structures are generally placed in an outdoor location and require some sort of communication link with a person or computer, exposure to adverse weather conditions, communication quality, and vandalism are often significant concerns. Very little, if any, patented technology exists for solving these problems with outdoor communication structures. However, a few patents exist that relate generally to the types of equipment often found in such structures. Some of these references include U.S. Pat. No. 4,002,831 issued to Aeschliman, U.S. Pat. No. 4,447,856 issued to Takahashi et al., U.S. Pat. No. 4,836,625 issued to Catta, U.S. Pat. No. 4,985,803 issued to Pum et al., U.S. Pat. No. 5,243,493 issued to Jeng et al., and U.S. Pat. No. 5,529,120 issued to Howard et al. The teachings of the indicated references do not adequately overcome the problems associated with outdoor communication structures and, more specifically, drive-in ordering apparatus which comprise one subgroup of outdoor communication structures.

A common concern with outdoor communication structures is their exposure to adverse weather conditions. Drive-in ordering apparatus are often positioned remotely with respect to the main business building and cannot receive the benefits of climate control and other protection from heat, wind, dust, and moisture. Remote positioning of a drive-in apparatus is a characteristic choice, for example, with fast-food restaurants where a driveway provides a controlled route for automobiles to approach an ordering apparatus. After placing an order, customers then proceed to a window at the main business building where they pay for and pick up their order. Remote positioning has the advantage of allowing restaurants to improve efficiency by preparing a customer's order while they wait in a line of automobiles to pay for and pick up their order. Other outdoor communication structures may be embedded within an outside facing wall of a building and may or may not be able to receive the benefits of climate control from the building. Even if climate control is possible, the equipment housed in the outdoor communication structure is still potentially exposed to adverse weather conditions.

Among the weather conditions listed above, heat, wind, and dust are particularly troublesome because few conventional equipment housings provide effective protection, particularly in arid or semi-arid climates. A common solution to equipment overheating inside a housing is to provide a fan along with intake and exhaust vents. This arrangement will probably cool the equipment, but at the cost of increased interference with communication, electricity usage, maintenance of fans, and intake of dust. Ordering apparatus typically have an intercom system with a microphone and speaker that allows customers and business personnel to communicate with each other. Accordingly, the vibration from a fan is transmitted to the intercom microphone and, thus, decreases the coherence of communication to and from the customer. Such interference is in addition to the already troublesome vibration from automobiles, pattering from rain, hissing from wind, and other sources. Also, because a fan continuously intakes and exhausts air, any dust or moisture in the air will be drawn into the housing where it can interfere with equipment such as speakers and/or microphones, fans, lights, and possibly electronic displays.

Another common concern associated with outdoor communication structures is vandalism. While typical equipment inside a structure, such as an intercom and internal readerboard lighting, is not particularly valuable, breaking into or damaging an outdoor communication structure is nevertheless a significant problem. Vandalized property requires repair or replacement for a business to avoid appearing shabby or run-down. Also, vandalism is often repeated and, with repetition, can become very costly even for damage to a inexpensive structure. Vandalism is an increasingly serious problem as more businesses begin to install relatively valuable equipment, such as liquid crystal displays, electroluminescent displays, light-emitting diode displays, and field emission displays. In addition, down time associated with vandalism can reduce profits and lead to customer dissatisfaction.

Thus, it can be seen from the above discussion that it would be an improvement in the art to provide outdoor communication structures having a housing that protects equipment from heat, dust, vibration, and vandalism. Unless better protection is provided, businesses will continue to lose profits from equipment malfunctions that require costly repair and turn away inconvenienced customers.

DISCLOSURE OF INVENTION

According to a preferred embodiment of the present invention, an apparatus is provided for protecting equipment in an outdoor communication structure from adverse weather conditions, vibration, and vandalism. The equipment used for the outdoor communication structure is installed within a housing that possesses hidden lip door edges and is assembled such that no screws, nuts, hinges, etc. are left exposed. Such a construction discourages vandalism since there are no crevices or edges large enough to insert a typical prying bar and no screws, nuts, or hinges to remove. Also according to a preferred embodiment, the speakers and microphones are largely isolated from potential vibration by surrounding them with vibration dampeners such as foam or other padding or insulation. Any vibration of the housing that might effect the speakers and microphones will then be reduced.

Heat, dust intake, vibration, and electricity usage are reduced by providing convection venting. According to a preferred embodiment, the internal cavity of the housing narrows at a top region of the housing. Vents in the top region of the housing allow air from a narrowed portion of the internal cavity to escape as it heats and expands. As hot air is displaced from the narrowed portion, cooler ambient air is drawn into the internal cavity through bottom vents in a bottom region of the housing. By placing convection vents on the side of the housing rather than the top, rain entry into the enclosure is prevented. Also, placing side vents at both the top and bottom of the housing creates a Venturi effect when wind blows across the top vents, drawing additional ambient air into the internal cavity through bottom the vents.

With increased use of electronic displays in outdoor communication structures, even a small amount of dust on the display screen can reduce image clarity. Accordingly, a preferred embodiment provides a display adjustment mechanism with adjustable support members for tilting a shelf and pressing the display screen firmly against the front panel of the housing to seal it off from dust or moisture accumulation.

In summary, the apparatus protects equipment in an outdoor communication structure from vandalism with hidden lip door edges and the absence of exposed screws, nuts, hinges, etc. Also, speakers and/or microphones are isolated from vibration with vibration dampeners. Further, heat, dust intake, vibration, and electricity usage are reduced because the internal cavity is cooled by convection venting. And finally, dust accumulation on an electronic display screen is prevented by a display mechanism with adjustable support members.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

BEST MODE FOR CARRYING OUT THE INVENTION

According to a preferred embodiment of the present invention, an apparatus is provided for protecting equipment in an outdoor communication structure from adverse weather conditions, vibration, and vandalism. Outdoor communication structures include, for example, automated teller machines, walk-up ordering apparatus, and, more particularly, drive-in ordering apparatus. A typical outdoor communication structure includes a housing with equipment such as speakers and/or microphones, fans, lights, and electronic displays. In a preferred embodiment, hidden lip door edges and an absence of exposed screws, nuts, hinges, etc. discourage vandalism since there are no obvious points of access into the housing. Also, the speakers and microphones are largely isolated from potential vibration by surrounding them with vibration dampeners such as foam, other padding, or insulation. Additionally, heat, dust intake, vibration, and electricity usage are reduced by providing convection venting. That is, by providing an internal cavity of the housing that narrows at a top region of the housing with vents in the top region and bottom region of the housing. Air from the narrowed internal cavity escapes through top vents as it heats and expands, allowing cooler ambient air to enter the internal cavity through bottom vents. A Venturi effect also occurs when wind blows across the top vents, drawing additional ambient air into the internal cavity through the bottom vents. Further, dust accumulation on an electronic display screen is reduced by providing a display adjustment mechanism with adjustable support members for tilting a shelf and sealing the display screen firmly against the front panel of the housing.

Figure 1:
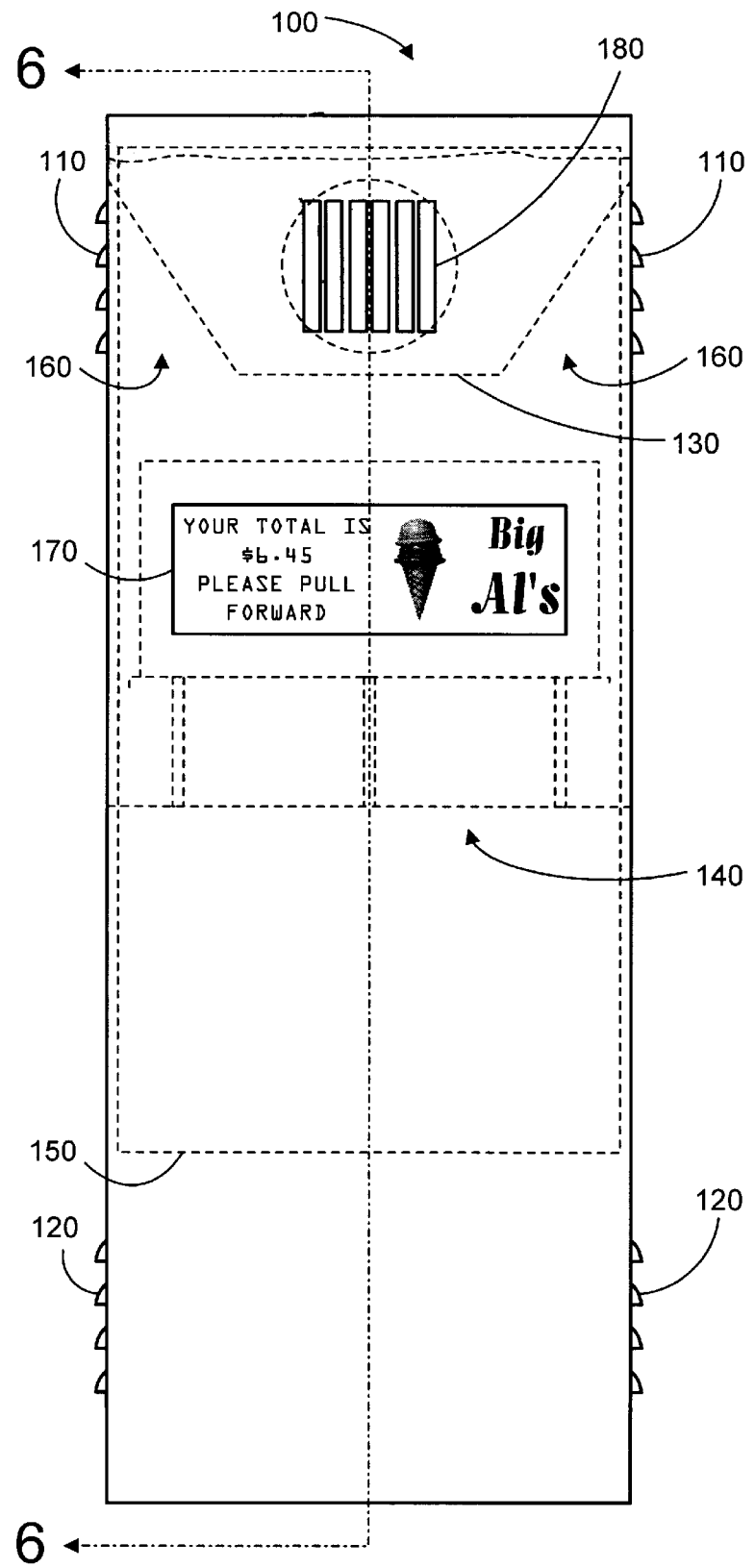
FIG. 1 is a front view of a drive-in ordering apparatus in accordance with a preferred embodiment of the present invention.
Figure 2:
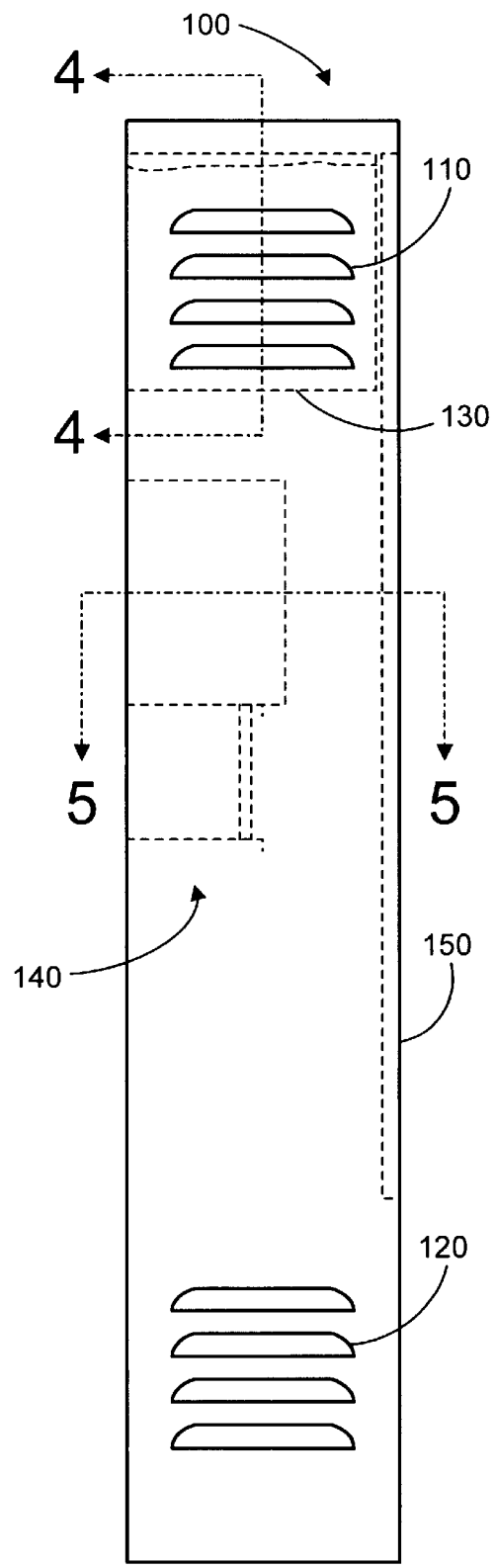
FIG. 2 is a side view of the apparatus of FIG. 1.

Referring now to FIGS. 1 and 2, a housing 100 for an outdoor communication structure according to a preferred embodiment of the present invention includes top vents 110, bottom vents 120, a vibration dampener 130, a display adjustment mechanism 140, and an access door 150. The outer dimensions and shape of housing 100 may vary widely depending on the particular use for the outdoor communication structure of which it forms a part. For example, the dimensions and shape of a drive-in ordering apparatus may vary between different restaurants. Likewise, the dimensions and shape of a drive-in ordering apparatus at a restaurant may differ from a drive-in apparatus at a bank, even though the functions of the drive-in ordering apparatus are similar. FIGS. 1 and 2 depict one embodiment having dimensions and a shape typical for a drive-in ordering apparatus at a fast-food restaurant. Namely, a rectangular shape wherein the width is approximately one-third the height and the depth is approximately one-half the width. A common height for housing 100 is approximately 1.2 m (4 feet).

Also referring to FIGS. 1 and 2, the inner shape and dimensions of housing 100 vary somewhat depending on the particular use for the outdoor communication structure. For the most part, the inner shape and dimensions of a preferred embodiment reflect the outer shape and dimensions, since housing 100 will generally be of single-wall construction. It is conceivable that housing 100 could have an outer shape or dimension very different from its inner shape or dimension. For example, in a double-wall construction, housing 100 could have both an inner and an outer shell where the outer shell served a primarily decorative purpose. The outer shell would have a shape and dimension largely independent of the inner shell's shape and dimension, while the inner shell served a primarily functional purpose. Housing 100 shown in FIGS. 1 and 2 has a single-wall construction, accordingly there is no inner shell and the inner shape and dimensions are largely similar to the outer shape and dimensions.

However, in a preferred embodiment as shown in FIGS. 1 and 2, the inner shape differs in one significant way from the outer shape. Even though housing 100 is single-walled, a preferred embodiment of housing 100 includes vibration dampener 130 inside housing 100, altering the inner shape and dimension. Accordingly, the internal cavity of housing 100 narrows at a top region of housing 100 where vibration dampener 130 forms the border for a narrowed portion 160. It is this inner shape of housing 100 that provides the novel benefit of convection venting. Vents 110, located in the top region of housing 100 and in proximity to narrowed portion 160, allow air from narrowed portion 160 of the internal cavity to escape as it heats and expands. As hot air is displaced from narrowed portion 160, cooler ambient air is drawn into the internal cavity of housing 100 through bottom vents 120.

Figure 3:
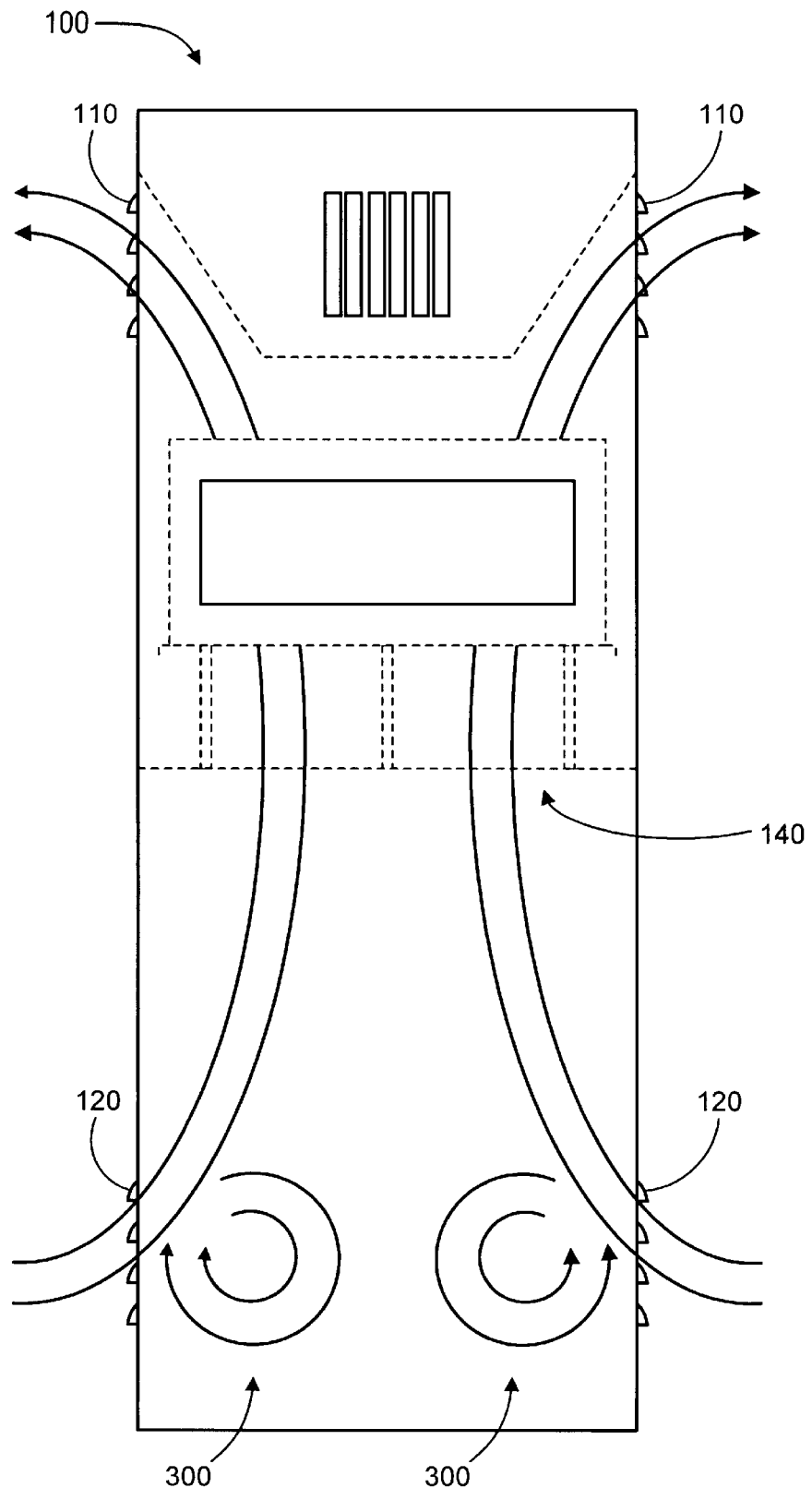
FIG. 3 is a front view of an air flow pattern through the apparatus of FIG. 1.

In FIG. 3, a diagram of an air flow pattern through housing 100 is displayed. The flow of cool air through bottom vents 120, up through the internal cavity, and out top vents 110 can be referred to as convection venting. In general, convection is said to be motion within a fluid due to density differences. For example, within a single body of air, if only a portion of the air is heated, then that portion will become less dense than the surrounding air. The less dense portion of air will tend to rise, causing air movement within the single body of air solely as a result of the density difference. Accordingly, when a portion of air in housing 100 is heated, it will tend to rise and exit top vents 110 as air flows in bottom vents 120 to replace the exiting air. As the sun heats the outer shell of housing 100, heat energy is transferred primarily through conduction and radiation to the surface of vibration dampener 130 that forms a border of narrowed portion 160. Consequently, all the surfaces forming the borders of narrowed portion 160 will heat the air within narrow portion 160 causing it to expand and exit through top vents 110. The actual air flow pattern exhibited by a particular housing 100 may vary depending on the inner shape and dimension of housing 100 and the equipment placed inside housing 100 that could form obstructions. For example, in housing 100 shown in FIG. 3, it might be necessary to size display adjustment mechanism 140 such that air could flow around it or to provide holes in mechanism 140 such that air could pass through it.

In convection venting according to a preferred embodiment, air flow would generally occur from the bottom region of housing 100 to the top region. However, depending on the inner shape and dimension of housing 100, eddies 300 may exist, providing additional pathways for movement of air through housing 100. Because a preferred embodiment provides convection venting, hot air in housing 100 is replaced with cooler ambient air. Additionally, because no cooling fans are needed, the power requirements of the outdoor communication structure are reduced. In conventional structures, 110 VAC is provided to meet power requirements, but in a preferred embodiment with convection venting, low voltage DC power is all that is needed to run the typical equipment in housing 100.

Figure 4:
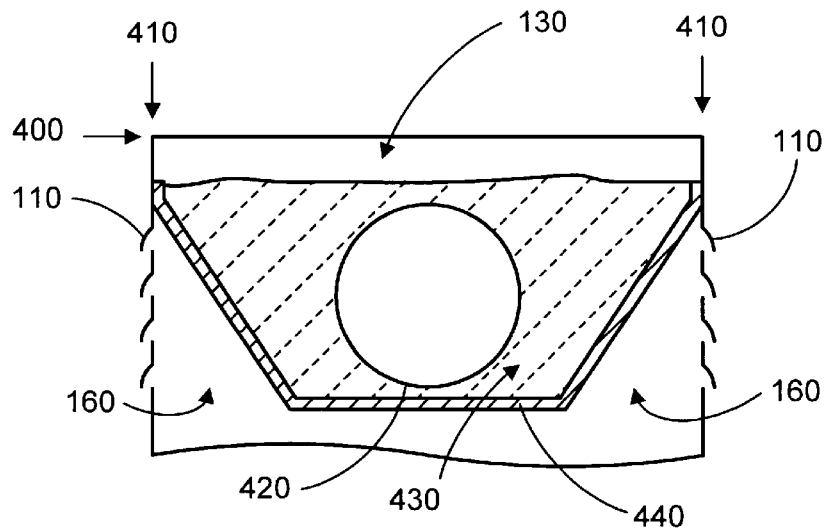
FIG. 4 is a sectional view of the top region of the apparatus shown in FIG. 2 taken along line 4—4.

Top vents 110 shown in FIG. 4 could conceivably be placed in a top panel 400 of housing 100 rather than in a side panel 410 as shown. Conventionally, top vents in a housing that provides convection venting are placed in top panel 400 to allow effective heat dissipation. However, such placement is impractical in housing 100 for an outdoor communication structure since top vents 110 in top panel 400 would render the equipment inside housing 100 much more susceptible to rain, snow, hail, dust, and other adverse weather conditions. By placing top vents 110 in side panel 410, the equipment inside housing 100 is less affected by adverse weather conditions. Additionally, by forming top vents 110 as shown in FIG. 4 such that an overhang shields the vent opening into the housing, nearly all rain, snow, hail, and dust can be prevented from entering housing 100 while still allowing heat to escape. One benefit of the design according to a preferred embodiment for narrowed portion 160, is that top vents 110 can be placed in side panel 410 without loss of convection venting.

In addition to convection venting, a Venturi effect will also occur in a preferred embodiment of housing 100 when wind blows across top vents 110, drawing additional ambient air into the internal cavity through bottom vents 120. As wind blows across top vents 110, a pressure drop will occur, drawing air out of housing 100 through top vents 110. Because bottom vents 120 are closer to the ground than top vents 110, the wind velocity across bottom vents 120 will be less than the wind velocity across top vents 110. Accordingly, the pressure drop across bottom vents 120 will be less than the pressure drop across top vents 110. The pressure difference between the bottom vents 120 and the top vents 110 will tend to cause a net flow of ambient into the internal cavity through bottom vents 120, then out through top vents 110. Thus, when wind is present, it will typically assist the convection venting. The Venturi effect may be accentuated by planting ground cover in proximity to bottom vents 120, since the ground cover hinders the wind and further decreases its velocity near bottom vents 120. The localized wind velocity decrease in turn accentuates the pressure difference between bottom vents 120 and top vents 110, encouraging more ambient air flow through the internal cavity. When the ground cover is watered, the presence of the water will have a localized evaporative cooling effect on the ambient air drawn into bottom vents 120, offering still further improvement in heat venting.

FIG. 4 offers additional detail for vibration dampener 130. In a preferred embodiment, vibration dampener 130 is a shelf bracket 440 juxtaposed with a vibration dampening substance 430. Vibration dampener 130 surrounds a microphone 420 with a vibration dampening substance 430 to hold it in place and to isolate it from vibrations present in conventional outdoor communication structures. Typically, vibration sources include rain or hail, automobiles (particularly those near a drive-in ordering apparatus), wind, and cooling fans for the housing; although, in a preferred embodiment using convection venting, such fans are absent. Vibration dampening substance 430 at least partially dampens the vibrations from such sources to improve the clarity of communication through microphone 420. Vibration dampening substance 430 preferably comprises closed-cell foam, but could also comprise other foams, padding, or insulation such as polystyrene foam, fiberglass or foam insulation, cloth stuffing, or materials used for cushioning of packaged objects that will also dampen the vibrations. While it is preferred to locate only microphone 420 in vibration dampener 130, alternatively, a microphone/speaker combination may be placed therein. Typically, a speaker or multiple speakers (not shown) are placed separate from microphone 420 elsewhere within housing 100, depending on what location(s) would be most conducive to coherent communication.

In a preferred embodiment, vibration dampener 130 also helps define the shape and dimension of narrowed portion 160 which is important in facilitating convection venting. Vibration dampener 130 forms an inclined border of narrowed portion 160 sloping toward top vents 110. As top panel 400 and side panels 410 raise in temperature from sun exposure, heat is transferred to the surface of vibration dampener 130 that forms a border of narrowed portion 160. As indicate above, all the surfaces forming the borders of narrowed portion 160 will then heat the air within narrowed portion 160. Alternatively, a second shelf bracket or other apparatus separate from shelf bracket 440 could form an inclined border of narrowed portion 160. If such were the case, then two shelf brackets would be present. One bracket for the inclined border and another for vibration dampener 130.

Because vibration dampener 130, or perhaps another apparatus, forms an inclined border, a chimney effect as found in a common fireplace will occur. In a fireplace, the inclined surface above the firebox leads into the chimney. The fire below heats the inclined surface primarily through radiation and the inclined surface, in turn, heats a thin layer of air adjacent to it. The heated layer of air is less dense than surrounding air and rises quickly up the inclined surface and into the chimney, drawing other air with it and essentially creating a draft that keeps smoke and combustion gases from the fireplace routed out through the chimney. In a similar manner, the inclined border of narrowed portion 160 facilitates removal of heated air in housing 100 out through top vents 110. Additionally, because housing 100 is preferably constructed from metal, housing 100 will conduct heat. Thus, the heated top panel 400 and side panels 410 will transfer heat to the inclined border by conduction as well as radiation. The improved heat transfer may result in an improved chimney effect in comparison to a firebox, which primarily transfers heat to its inclined surface by radiation.

Figure 5:
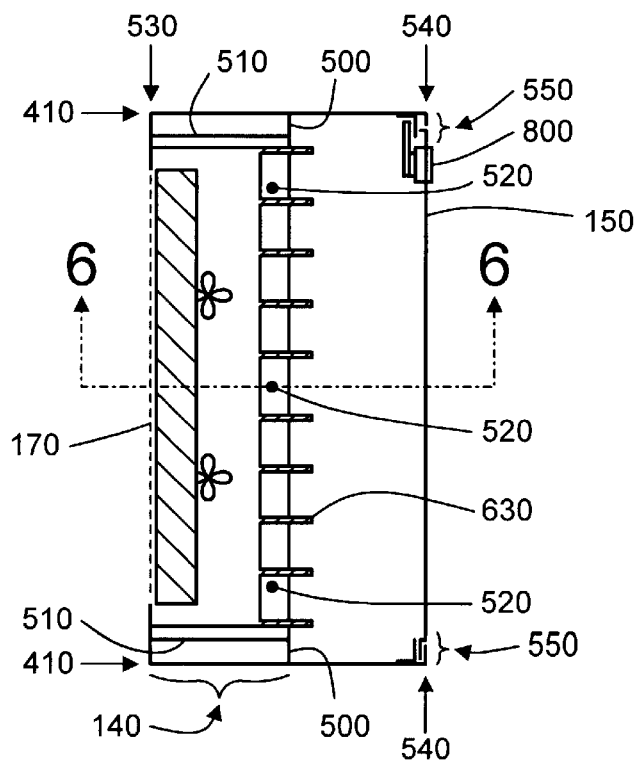
FIG. 5 is a sectional view of the electronic display unit and display adjustment mechanism of the apparatus shown in FIG. 2 taken along line 5—5.
Figure 6:
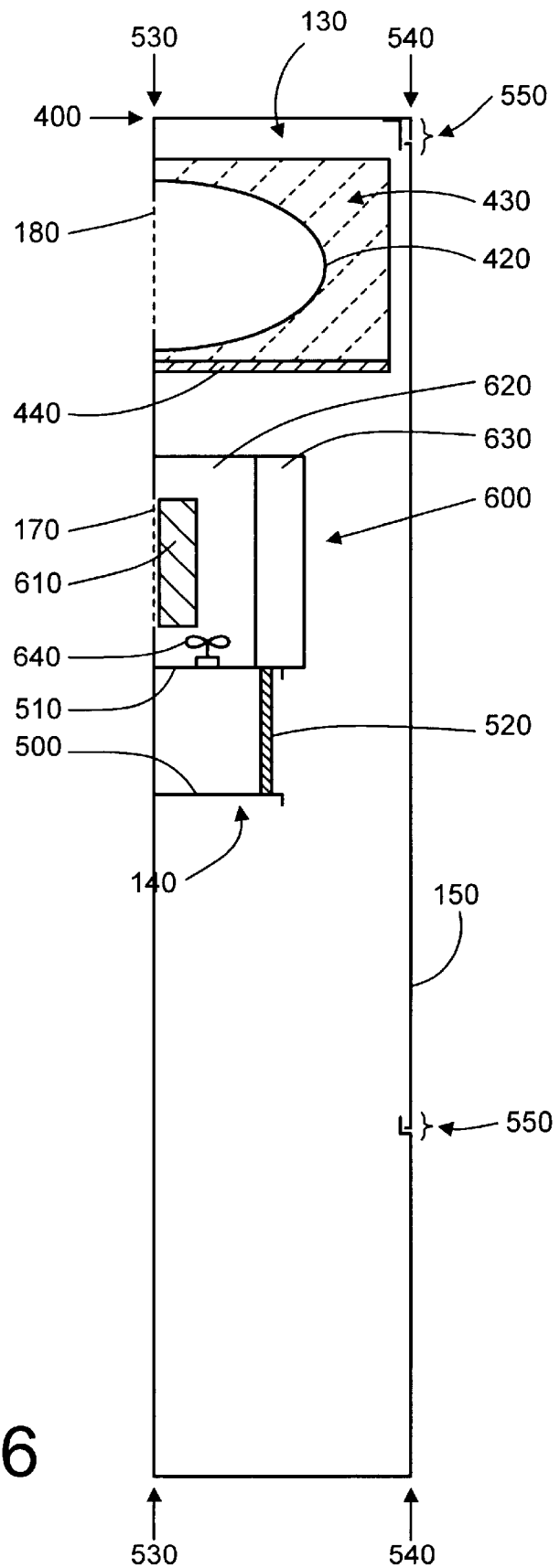
FIG. 6 is a sectional view of the electronic display unit and display adjustment mechanism of the apparatus shown in FIGS. 1 and 5 taken along line 6—6.
Figure 7:
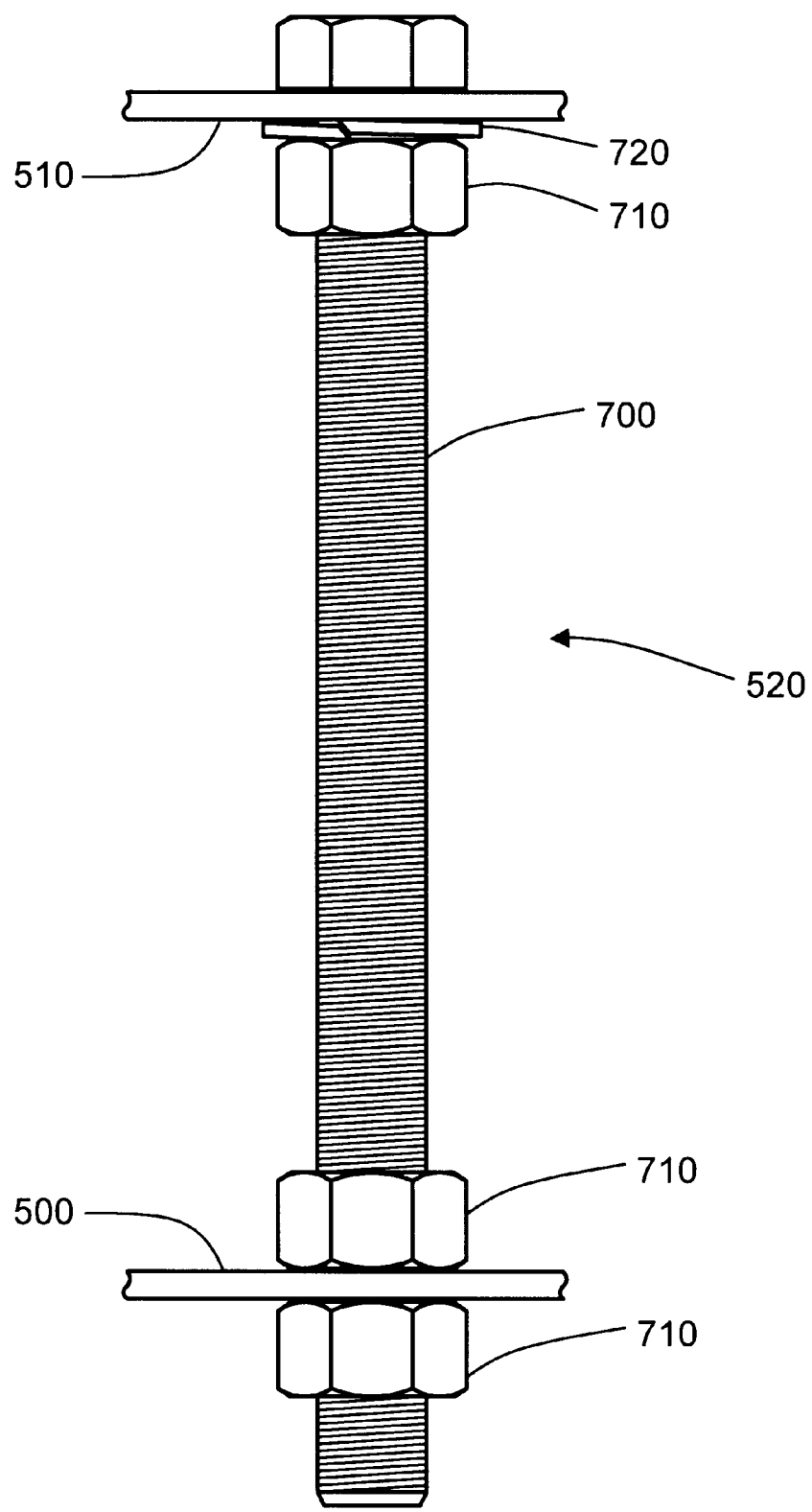
FIG. 7 is a side view of an adjustable support member according to a preferred embodiment of the present invention.

Referring now to FIGS. 5 through 7, display adjustment mechanism 140 is shown in greater detail. A preferred embodiment of display adjustment mechanism 140 consists primarily of a rigid shelf 500, a flexible shelf 510, and a compression rods 520. As shown in FIGS. 5 and 6, a preferred embodiment of rigid shelf 500 is secured to a front panel 530 and both side panels 410, while a preferred embodiment of flexible shelf 510 is secured only to front panel 530. Front panel 530 is preferably a continuous sheet of metal with cutouts for display window 170 and a microphone window 180, as shown in FIG. 1. A gap exists between both side panels 410 and flexible shelf 510 allowing flexible shelf 510 to be rotated about its axis of connection with front panel 530. The extent of rotation need not be large as would exist if flexible shelf 510 were secured to front panel 530 by a hinge. Rather, all that is needed is about 1° to 5° of movement both up and down about the axis of connection. At least one compression rod 520, but preferably three, between rigid shelf 500 and flexible shelf 510 supports flexible shelf 510, preventing it from collapsing when an electronic display unit 600 is placed thereon. The ability to rotate flexible shelf 510 up and down and secure it in a suitable position with compression rods 520 provides a mechanism for pressing display unit 600 firmly against front panel 530.

Pressing display unit 600 firmly against front panel 530 decreases maintenance on the outdoor communication structure of which housing 100 forms a part. Display window 170, forms a part of front panel 530 and typically comprises a pane of transparent glass or plastic that protects display unit 600 but still allows the viewing of images and/or text presented by display unit 600 through front panel 530. Display window 170 must protect display unit 600 from adverse weather conditions, vandalism, etc. without diminishing the quality of images and/or text presented by display unit 600. In the event of vandalism or other damage to display window 170, it is preferable for it to be easily replaceable, as with a typical pressed-in-place display windows. Conventional housings 100 do not adequately seal display unit 600 against front panel 530, allowing dust, moisture, etc. to accumulate between display window 170 and display unit 600. Accordingly, frequent maintenance is required to maintain adequate image and/or text quality. However, in a preferred embodiment of the present invention, display adjustment mechanism 140 presses display unit 600 firmly against front panel 530 to maintain an adequate seal and prevent accumulation of dust, moisture, etc. An adequate seal is achieved by first bolting display unit 600 to flexible shelf 510 in a position juxtaposing at least the lower edge of display unit 600 firmly against front panel 530. Next, compression rods 520 are adjusted upward, rotating flexible shelf 510 about its axis of connection with front panel 530, pressing display unit 600 against front panel 530, and sealing display window 170. An optional gasket between display window 170 and display unit 600 may provide additional assurance that a seal will be maintained.

A preferred embodiment of compression rod 520 is depicted in FIG. 7. Multiple alternative embodiments exist for compression rod 520 since all that is required is a mechanism for selectively adjusting the position of flexible shelf 510 sufficient to press display unit 600 firmly against front panel 530. The embodiment shown in FIG. 7 is a long bolt 700 secured between flexible shelf 510 and rigid shelf 500 by nuts 710 and lock washer 720. Compression rod 520 comprises inexpensive components that can be readily assembled and secured to flexible shelf 510 and rigid shelf 500 through holes drilled therein. It also provides simple up and down adjustment by turning one or more nuts 710. Two nuts are provided adjacent to rigid shelf 500 to lock flexible shelf 510 in position, otherwise, vibration of housing 100 or display unit 600 might cause gradual lowering of flexible shelf 510, releasing the seal of display unit 600 against front panel 530.

Also as depicted in FIGS. 5 and 6, display unit 600 mounted within housing 100 includes an electronic display 610, a display housing 620, cooling fins 630, and internal display fans 640. A wide variety of electronic displays 610 are conducive for use in an outdoor communication structure according to a preferred embodiment, including liquid crystal displays, electro-luminescent displays, light-emitting diode displays, and field emission displays. A given structure may include a monochrome display, a color display, or both and such displays vary in dimension depending on their purpose.

By itself, display 610 is relatively fragile and is mounted within display housing 620 for protection during handling and installation. Display housing 620 also protects display 610 and its associated wiring by providing plug receptacles for input/output and power connections. Because display 610 generates heat and receives heat from sun exposure to housing 100, cooling fins 630 and internal display fans 640 are provided to dissipate heat to the surroundings, otherwise, heat accumulates and damages display 610. Internal display fans 640 keep air circulating within the sealed display housing 620 so that it is distributed evenly, thus encouraging effective dissipation. Fans 640 are relatively small and operate adequately on the low voltage DC power supply since they need only circulate the air inside sealed display housing 620. Additionally, cooling fins 630 increase the surface area of display housing and, accordingly, increasing the rate of heat transfer to the surroundings.

As discussed above and shown in FIG. 3, the convection venting within a preferred embodiment of housing 100 will provide air flow/movement through housing 100. Notably, display adjustment mechanism 140 preferably only spans a portion of the internal cavity withing housing 100, allowing cool air from bottom vent 120 to easily flow past display adjustment mechanism 140. Additionally, rigid shelf 500, flexible shelf 510, and cooling fins 630 are sized such that the flow of air contacts cooling fins 630 further increasing the rate of heat dissipation. By providing an air flow through cooling fins 630, convective cooling of the equipment occurs in addition to the cooling that results from radiation and conduction of heat from display housing 600 to the surroundings. Further, the convective cooling occurs despite the absence of fans in housing 100.

Figure 8:
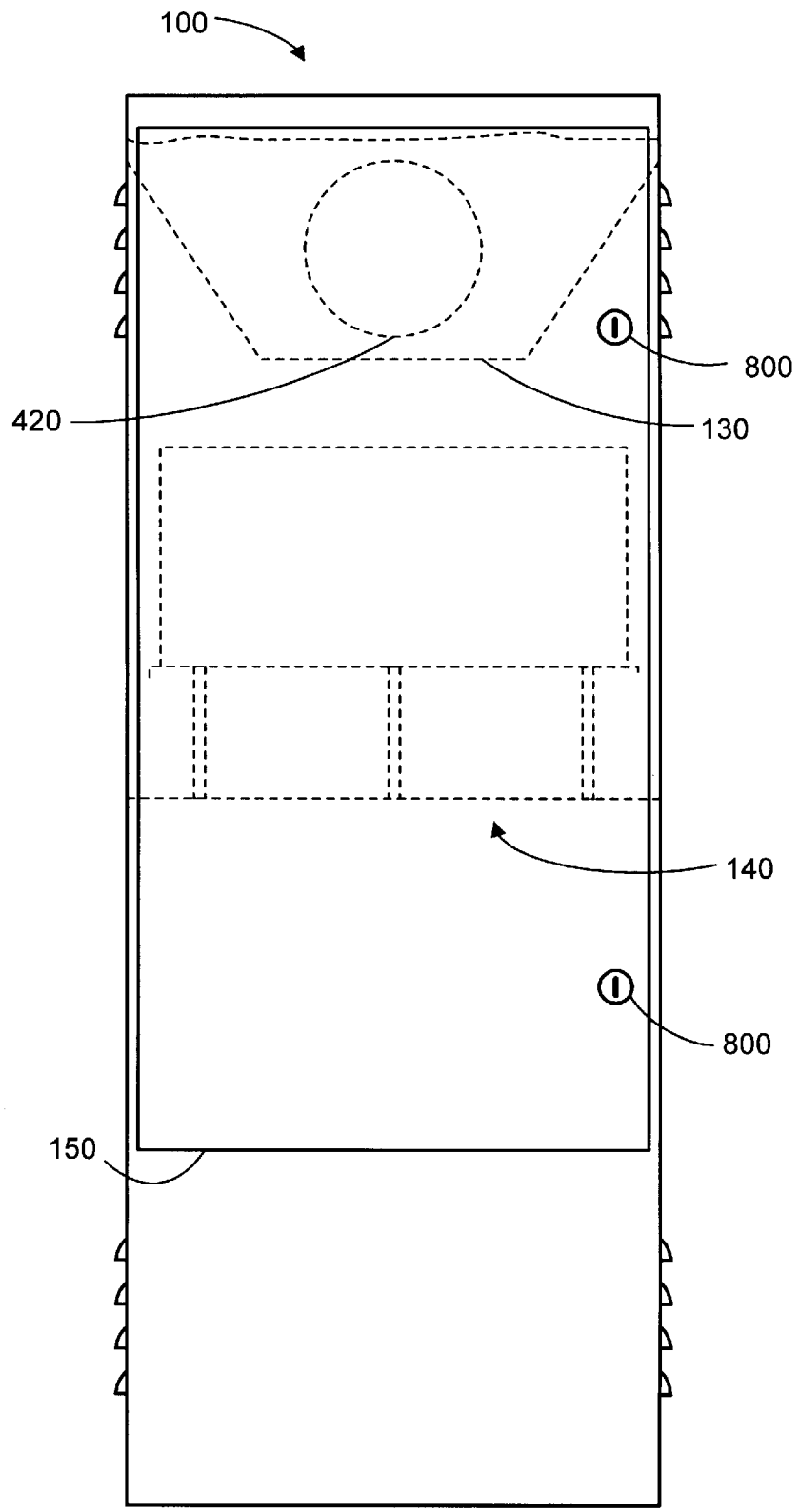
FIG. 8 is a rear view of the apparatus shown in FIG. 1.

FIG. 8 in combination with FIGS. 5 and 6 provide greater detail regarding access door 150. Access door 150 is inset into rear panel 540 of housing 100 and secured by key locks 800. No door edges, screws, nuts, hinges, etc. are exposed on housing 100, and yet, easy access is provided. The absence of such items discourages vandalism since no crevices or edges large enough to insert a typical pry bar and no protrusions capable of being grasped with pliers, bolt cutters, etc. are present. A very small crevice may exist between the outside edges of access door 150 and rear panel 540. However, housing 100 may be manufactured to sufficiently close tolerance that a pry bar capable of prying open access door 150 still may not be inserted into the crevice. Even if a pry bar could somehow be wedged into the crevice, the hidden lip door edges 550 provide additional protection by hindering the effectiveness of the pry bar. Essentially, the hidden lip door edges 550 only allow a small portion of the pry bar to be inserted into the crevice. Accordingly, it is difficult for the pry bar to obtain sufficient leverage to pry open access door 150. Access door 150 is preferably sized to provide easy access to microphone 420, vibration dampener 130, and display adjustment mechanism 140 in the event that equipment upgrades or maintenance are needed. This is accomplished by an access door 150 with a height equal to approximately 75% of the height of housing 100. In the event that additional speakers (not shown) or display screens (not shown) are mounted in side panels 410 or front panel 530, an access door 150 sized as indicated should nevertheless continue to provide the needed access.

Figure 9:
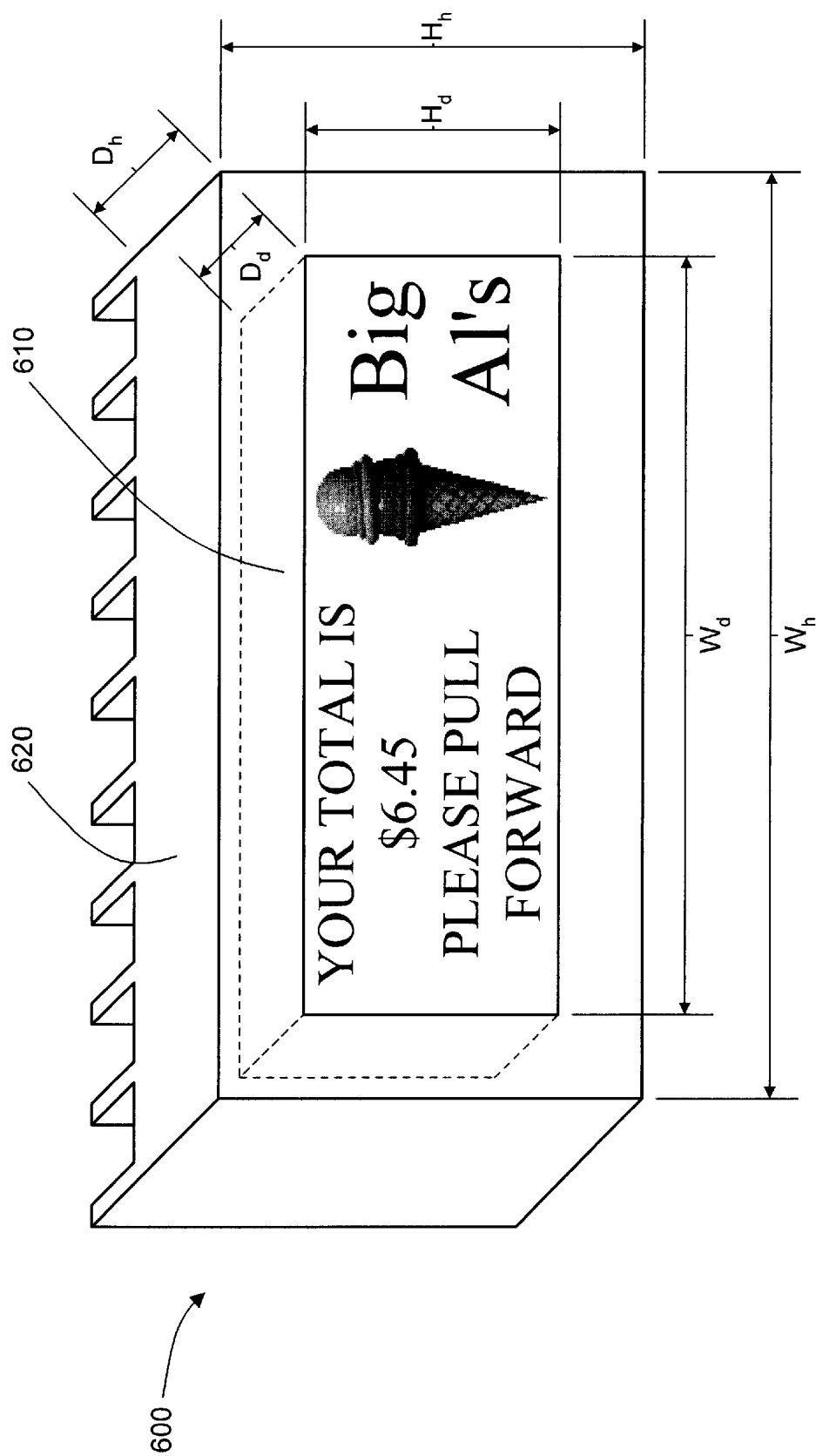
FIG. 9 is a perspective view of the electronic display unit.

FIG. 9 shows electronic display unit 600 with electronic display 610 mounted within display housing 620. Since electronic display 610 is part of an outdoor communication structure, it is subject to overheating from sun exposure, but it also generates heat during normal operation. It is imperative that electronic display 610 be relieved of this incessant exposure either to heat from the sun, self-generated heat, or both. Otherwise, the operation life of display 610 can be seriously shortened, requiring costly repair or replacement. To protect electronic display 610 from dust and moisture, it is encased within display housing 620, though it is somewhat paradoxical that the very housing that protects it from dust and moisture increases the likelihood of heat damage. Because the encasing prevents proper dissipation of heat, self-generated heat and heat from sun exposure tends to accumulate in conventional display housings. At times, a single episode of heat exposure is significant enough to cause sudden failure of the electronic display. Generally, however, the day-after-day exposure to elevated temperatures simply wears out the electronic display, gradually diminishing image quality and substantially shortening the display's operation life.

Fortunately, proper design of electronic display unit 600 will minimize heat retention and damage to display 610. In a preferred embodiment according to the present invention, display housing 620 is sized so that its width, height, and depth ($W_h$, $H_h$, and $D_h$, respectively as indicated in FIG. 9) exceed the display 610 width, height, and depth ($W_d$, $H_d$, and $D_d$, respectively as indicated in FIG. 9). Also, the product of the housing width times height must be greater than or equal to the product of two times the display width times height. In addition, the housing depth must be less than or equal to one-fiftieth of the product of the housing width times height. Display housing 620 sized accordingly will possess a maximized surface area for its volume, which assists in effective heat dissipation.

Figure 10:
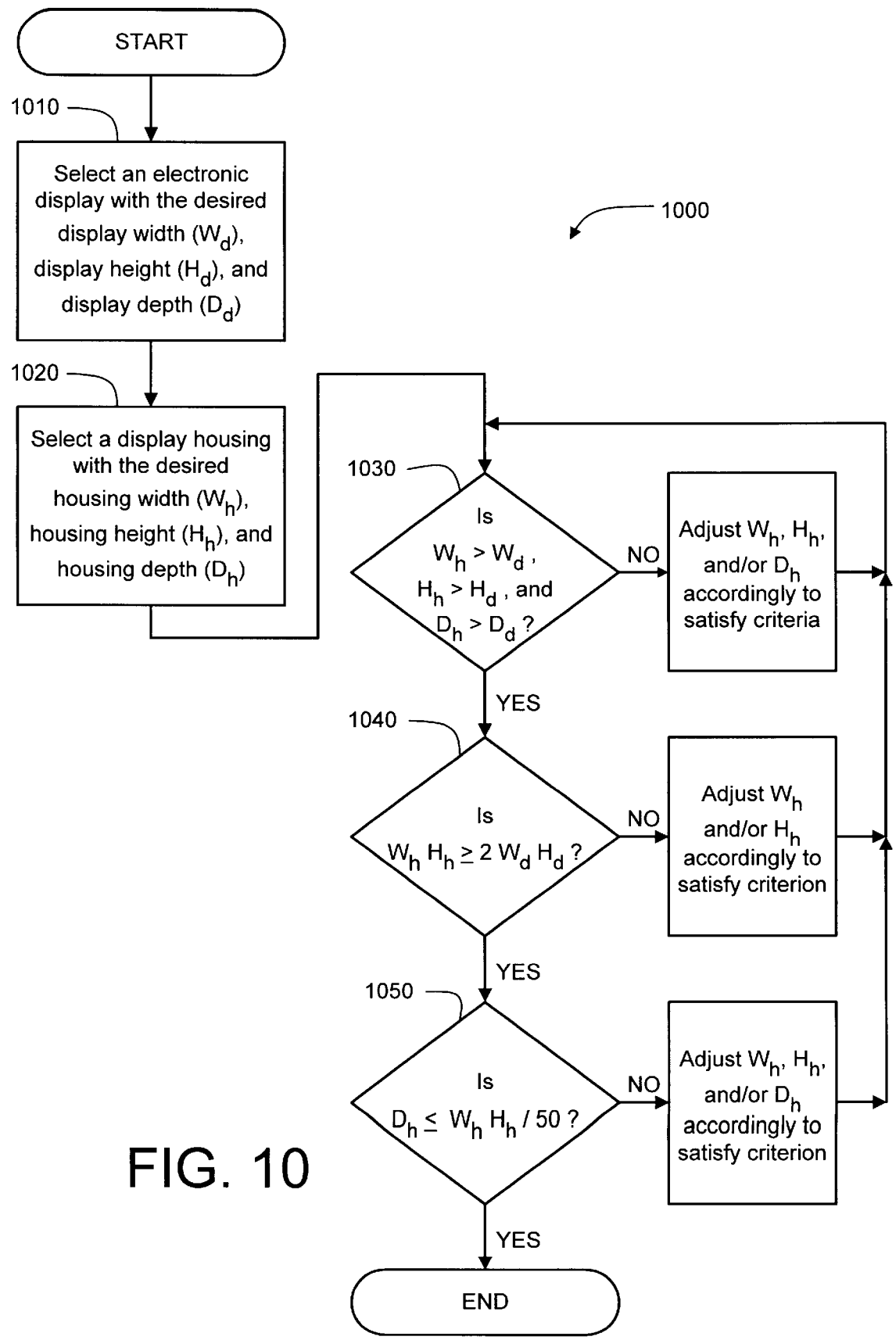
FIG. 10 is a flow diagram of a method for sizing the electronic display unit to maximize heat transfer according to a preferred embodiment of the present invention.

FIG. 10 provides a flowchart depicting a method 1000 for sizing display housing 620 according to a preferred embodiment of the present invention. In step 1010 electronic display 610 is selected having a desired width, height, and depth ($W_d$, $H_d$, and $D_d$). Generally, the selection of electronic display 610 will involve other factors that may be of greater importance than its dimensions, or there may be a very limited choice as to different dimensions. Such other factors include the type of use, image size, image color requirements, image resolution, cost, power requirements, hardware/software compatibility, etc. Accordingly, it may often be the case that the dimensions of electronic display 610 are dictated by other more critical factors, and method 1000 is described with this condition in mind. In the contrary event that the dimensions of display housing 620 are a critical factor, the mathematical criteria discussed herein may be rearranged and the steps of method 1000 reordered to allow the dimensions of display housing 620 to dictate the allowable dimensions of electronic display 610.

Next, in step 1020, a display housing 620 is selected having a desired width, height, and depth ($W_h$, $H_h$, and $D_h$). Since it is preferred that display housing 620 encases display 610, each dimension of display housing 620 must be greater than each corresponding dimension of display 610 as indicated in step 1030. If this criteria is not satisfied, then step 1020 must be repeated by selecting new display housing 620 dimensions. Alternatively, it is conceivable that a present or future display 610 will not need to be encased in display housing 620 and the criteria in step 1030 can be modified accordingly. As stated in FIG. 10 for step 1040, the product of the housing width times height must be greater than or equal to the product of two times the display width times height. Also as stated in FIG. 10 for step 1050, the housing depth must be less than or equal to one-fiftieth of the product of the housing width times height. The criteria in both step 1040 and step 1050 must be met for the surface area of display housing 620 to be maximized for a desired volume according to a preferred embodiment of the present invention.

A brief analysis of the practical effects of the criteria in method 1000 will help reveal how display housing 620 can be best sized. Noticeably, the criteria of method 1000 dictate both minimums and maximums for display housing 620 dimensions. For example, the product of housing width times height must be at least large enough to equal the product to two times the display width times height, but it can be larger. The housing width or height accordingly can increase infinitely and still meet step 1040 criteria. Of course there are other practical limitations on housing width and height, namely the dimensions of housing 100 into which display housing 620 must fit, the increased cost of a larger display housing 620, and other physical limitations. These practical limitations will vary depending on the type of outdoor communication structure of which housing 100 forms a part, but the limitations nevertheless dictate maximum dimensions. A similar analysis of step 1050 criteria reveals that housing depth being less than or equal to one-fiftieth of the product of housing width times height simply reflects a maximum depth for display housing 620.

Notably, step 1040 and step 1050 criteria are also inter-related. Specifically, once display housing 620 dimensions are selected in step 1020 and housing width and height satisfy step 1040 criteria, it may be necessary to select a new housing depth because the combination of width and height prevent the selected depth from passing step 1050 criteria. Similarly, once steps 1030 to 1050 are all satisfied for given housing dimensions, if either width or height are changed, then the maximum depth from step 1050 will also change and the selected depth may require modification to stay within step 1050 criteria. For example, in a housing 100 that is short and narrow but rather deep, it may be physically impossible for width and height of display housing 620 to be relatively large. Because width and height are physically limited, it may be that step 1050 will require a depth much less than could fit within housing 100. Clearly, it would be physically possible to install a deeper display housing 620 within housing 100, but display housing 620 would lack the benefits of maximizing surface for a minimum volume. Namely, even though such a display housing 620 has a relatively large surface area for dissipating heat, it comes at the cost of a larger volume than is necessary. If method 1000 were followed, then a display housing 620 of equivalent surface area could be designed having a smaller volume and less cost of materials and construction.

A preferred electronic display unit 600 also includes internal display fans 640 (shown in FIG. 6) that evenly distribute heat throughout the display housing to prevent localized overheating of the display. If display housing 620 is heated uniformly by distributing heat with internal display fans 640, then heat dissipation will take place over a greater surface area and, accordingly, increase. Without fans 640, heat accumulates in localized regions of display housing 620 and electronic display 610 resulting in diminished heat dissipation because the heated regions have a smaller surface area available for heat dissipation. Further, external cooling fins 630 are provided on display housing 620 to increase its surface area even more and correspondingly increase the dissipation of heat.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation.

What is claimed is:

1. An ordering apparatus comprising:
   a) an outer housing, the outer housing including a front panel, a first side panel, and a second side panel, the outer housing including at least one top vent and at least one bottom vent, the outer housing defining an interior space having a top portion;
   b) an audio communication device attached in the said interior space;
   c) a vibration dampener mechanism inside the outer housing and at least partially surrounding the audio communication device to reduce communication interference; and
   d) an electronic display device, said electronic display device mounted in an display housing, said display housing sealed to prevent substantial air flow from the display housing, said display housing attached in said interior space, said electronic display providing visual ordering information through said outer housing and said display housing.

2. The apparatus of claim 1 wherein the electronic display is attached beneath said audio communication device such that air flowing from said at least one lower vent to said at least one upper vent flows around the display housing and cools the electronic display.

3. The apparatus of claim 2, additionally comprising a display adjustment mechanism inside the housing having at least one adjustable support member, the display adjustment mechanism holding said electronic display firmly against the outer housing front panel.

4. The apparatus of claim 3, wherein the display adjustment mechanism comprises a rigid shelf, a flexible shelf, and at least one compression rod securing the flexible shelf in a selected position such that the display housing is held firmly against the outer housing front panel.

5. The apparatus of claim 2, wherein the outer housing has a rear panel and the hidden lip access door mechanism comprises an access door having door edges inset into the rear panel and manufactured to sufficiently close tolerance that a pry bar capable of prying open the access door may not be inserted between the door edges and rear panel.

6. The apparatus of claim 2, wherein the audio communication device comprises a microphone, and wherein the vibration dampener mechanism comprises at least one vibration dampening substance juxtaposed against the microphone.

7. The apparatus of claim 6, additionally comprising a microphone window having at least one vertical slot formed in the outer housing.

8. The apparatus of claim 1, wherein the vibration dampener mechanism narrows a top portion of the interior space to encourage convention venting from said at least one lower vent to said at least one upper vent.

9. The apparatus of claim 1, wherein the vibration dampener mechanism is adapted to being associated with a communication device.

10. The apparatus of claim 1 where the display housing includes at least one fan, the at least one fan circulating air within the display housing.

11. An ordering apparatus comprising:
   a) an outer housing at least partially defining at least one internal cavity having a narrowed top portion and a bottom portion, the housing including a front panel, a first side panel, and a second side panel;
   b) at least one top vent formed in the outer housing providing an air path to the narrowed top portion of the at least one internal cavity;
   c) at least one bottom vent formed in the outer housing providing an air path to the bottom portion of the at least one internal cavity;
   d) a microphone, the microphone attached in said top portion of said at least one internal cavity, the microphone receiving customer orders;
   e) a vibration dampener mechanism inside the outer housing and at least partially surrounding the microphone, the vibration dampener mechanism reducing communication interference;
   e) an electronic display, said electronic display mounted in an display housing, said display housing sealed to prevent substantial air flow from the display housing, said display housing attached inside said at least one internal cavity, said electronic display providing customer ordering information through said front panel, said display housing positioned in said at least one internal cavity such that air flowing from said at least one bottom vent to said at least one top vent cools said electronic display.

12. The apparatus of claim 11, additionally comprising a hidden lip access door mechanism for preventing intrusion into the housing with a pry bar.

13. The apparatus of claims 12, additionally comprising a display adjustment mechanism inside the outer housing having at least one adjustable support member, the display adjustment mechanism holding said display housing firmly against the outer housing front panel.

14. The apparatus of claim 12, wherein the outer housing has a rear panel and the hidden lip access door mechanism comprises an access door having door edges inset into the rear panel and manufactured to sufficiently close tolerance that a pry bar capable of prying open the access door may not be inserted between the door edges and rear panel.

15. The apparatus of claim 11 wherein the at least one top vent comprises a plurality of vents on the first side panel and a plurality of vents on the second side panel, and wherein the at least one bottom vent comprises a plurality of vents on the first side panel and a plurality of vents on the second side panel.

16. The apparatus of claim 11 wherein the at least one top vent and at least one bottom vent comprises covered vents that open downward.

17. The apparatus of claim 16, additionally comprising a microphone window having at least one vertical slot formed in the outer housing.

18. The apparatus of claim 11 where the display housing includes at least one fan, the at least one fan circulating air within the display housing.

19. An ordering apparatus comprising:
 a) an outer housing at least partially defining at least one internal cavity having a narrowed top portion and a bottom portion, the outer housing including a front panel, a first side panel, and a second side panel;
 b) a hidden lip access door mechanism for preventing intrusion into the outer housing with a pry bar;
 c) a plurality of top vents on the first side panel and a plurality of top vents on the second side panel providing an air path to the narrowed top portion of the at least one internal cavity;
 d) a plurality of bottom vents on the first side panel and a plurality of bottom vents on the second side panel providing an air path to the bottom portion of the at least one internal cavity; and
 e) at least one vibration dampening substance inside the outer housing juxtaposed against a microphone;
 f) an electronic display, said electronic display mounted in an display housing, said display housing sealed to prevent substantial air flow from the display housing, said display housing including a transparent front side to facilitate viewing of the electronic display through the display housing, said display housing including at least one fan, the at least one fan circulating air within the display housing, said display housing attached inside said at least one internal cavity, said electronic display providing customer ordering information through said front panel, said display housing positioned in said at least one internal cavity such that air flowing from said at least one bottom vent to said at least one top vent cools said electronic display; and
 g) a display adjustment mechanism inside the housing having at least one adjustable support member, the display adjustment mechanism holding said display housing front side firmly against the outer housing front panel.

20. The apparatus of claim 19, wherein the outer housing has a rear panel and the hidden-lip access door mechanism comprises an access door having door edges inset into the rear panel and manufactured to sufficiently close tolerance that a pry bar capable of prying open the access door may not be inserted between the door edges and rear panel.

21. The apparatus of claim 20, wherein the hidden lip access door mechanism additionally comprises a first door edge juxtaposed against a first inset lip secured to the housing and an inset second door edge juxtaposed between a portion of the rear panel and a second inset lip secured to the outer housing.

22. The apparatus of claim 19, wherein the plurality of top vents and plurality of bottom vents comprise covered vents that open downward.

23. The apparatus of claim 19, wherein the at least one vibration dampening substance comprises closed-cell foam and the closed-cell foam is juxtaposed against all microphones and speaker/microphone combinations.

24. The apparatus of claim 23, wherein the display adjustment mechanism comprises a rigid shelf, a flexible shelf, and at least one compression rod securing the flexible shelf in a selected position.

25. The apparatus of claim 24, wherein the rigid shelf has at least four edges and three of its at least four edges are secured to the outer housing, wherein the flexible shelf has a plurality of edges and one of its edges is secured to the outer housing, and wherein at least three compression rods couple the rigid shelf to the flexible shelf, securing the flexible shelf in a selected position.

26. The apparatus of claim 19, additionally comprising a microphone window having at least one vertical slot formed in the outer housing.

27. An ordering apparatus comprising:
 a) an outer housing having at least one internal cavity partially defined by a front panel, a rear panel, and two side panels, the at least one internal cavity having a narrowed top portion and a bottom portion;
 b) an access door having door edges inset into the rear panel and manufactured to sufficiently close tolerance that a pry bar capable of prying open the access door may not be inserted between the door edges and rear panel, wherein a first door edge is juxtaposed against a first inset lip secured to the housing and an inset second door edge is juxtaposed between a portion of the rear panel and a second inset lip secured to the outer housing;
 c) one top vent formed in each of the two side panels, providing an air path to the narrowed top portion of the at least one internal cavity;
 d) one bottom vent formed in each of the two side panels, providing an air path to the bottom portion of the at least one internal cavity;
 e) closed-cell foam juxtaposed against a microphone and supported by a shelf bracket secured to two side panels, the shelf bracket defining an inclined border of the narrowed top portion of the at least one internal cavity;
 f) an electronic display, said electronic display mounted in an display housing, said display housing sealed to prevent substantial air flow from the display housing, said display housing including a transparent front side to facilitate viewing of the electronic display through the display housing, said display housing including at least one fan, the at least one fan circulating air within the display housing, said display housing attached inside said at least one internal cavity, said electronic display providing customer ordering information through said front panel, said display housing positioned in said at least one internal cavity such that air flowing from said at least one bottom vent to said at least one top vent cools said electronic display; and g) a display adjustment mechanism inside the outer housing having a rigid shelf, a flexible shelf, and three compression rods coupling the rigid shelf to the flexible shelf and securing the flexible shelf in a selected position, wherein the rigid shelf has four edges and three of its four edges are secured to the front panel and two side panels and wherein the flexible shelf has four edges and one of its edges is flexibly coupled to the front panel, the display adjustment mechanism holding said electronic display firmly against the outer housing front panel.

28. The apparatus of claim 27, wherein the display housing is sized according to the following steps:

a) selecting an electronic display having a display width ($W_d$), display height ($H_d$), and display depth ($D_d$);

b) selecting a display housing having a housing width ($W_h$), a housing height ($H_h$), and a housing depth ($D_h$) according to the following criteria:

i) $W_h$ is greater than $W_d$, $H_h$ is greater than $H_d$, and $D_h$ is greater than $D_d$;

ii) the product of $W_h$ times $H_h$ is greater than or equal to the product of two times $W_d$ times $H_d$; and iii) $D_h$ is less than or equal to one-fiftieth of the product of $W_h$ times $H_h$.

29. The apparatus of claim 23, additionally comprising a microphone window having at least one vertical slot formed in the front panel.

30. The apparatus of claim 20, wherein the display housing is sized according to the following steps:

a) selecting an electronic display having a display width ($W_d$), display height ($H_d$), and display depth ($D_d$);

b) selecting a display housing having a housing width ($W_h$), a housing height ($H_h$), and a housing depth ($D_h$) according to the following criteria:

i) $W_h$ is greater than $W_d$, $H_h$ is greater than $H_d$, and $D_h$ is greater than $D_d$;

ii) the product of $W_h$ times $H_h$ is greater than or equal to the product of two times $W_d$ times $H_d$; and iii) $D_h$ is less than or equal to one-fiftieth of the product of $W_h$ times $H_h$.

* * * * *